United States Patent [19]

Check et al.

[11] 4,378,670
[45] Apr. 5, 1983

[54] HAND SCOOP FOR GRASS AND LEAVES

[76] Inventors: Mathias M. Check, 34 Bowman Dr., Greenwich, Conn. 06830; Elia L. Goodby, 22 Barrow Dr., East Greenwich, R.I. 02818

[21] Appl. No.: 182,215

[22] Filed: Aug. 28, 1980

[51] Int. Cl.³ .............................................. A01D 7/00
[52] U.S. Cl. ............................. 56/400.01; 56/400.12; 294/50.8; 294/55
[58] Field of Search ................ 294/49, 55, 50.5, 50.6, 294/50.8, 50.9, 52; 56/400.01, 400.12

[56] References Cited

U.S. PATENT DOCUMENTS

| 275,505 | 4/1883 | Lindsey | 294/50.8 |
|---|---|---|---|
| 364,313 | 6/1887 | Skillin | 294/55 |
| 816,236 | 3/1906 | Kline | 294/50.8 |
| 1,775,571 | 9/1930 | Romer | 294/50.8 |
| 2,028,680 | 1/1936 | Mayeda et al. | 294/50.8 |
| 2,180,544 | 11/1939 | Nissen | 56/400.01 |
| 2,546,113 | 3/1951 | Spang | 294/1 R |
| 2,563,223 | 8/1951 | Drelter | 294/55 |
| 2,644,453 | 7/1953 | Benoit | 294/50.8 |
| 2,652,279 | 9/1953 | Morris | 294/50.9 |
| 2,960,230 | 11/1960 | Fracker | 294/49 |
| 3,106,419 | 10/1963 | Estwing | 294/55 |
| 3,809,421 | 5/1974 | James | 56/400.12 |

Primary Examiner—Paul J. Hirsch
Attorney, Agent, or Firm—Alfred E. Miller

[57] ABSTRACT

A pair of concave scoops that are operated by a person's hands which have teeth that function as rakes to assemble leaves, grass clippings, and other debris into a pile that can be lifted for disposal into garbage bags, wheelbarrows, or the like. The scoops are lightweight, and easily grasped and manuvered into position to lift up and dispose of any unwanted debris from lawns and other locations.

9 Claims, 7 Drawing Figures

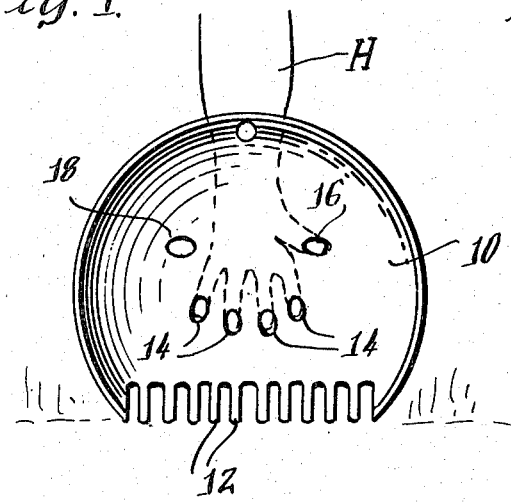
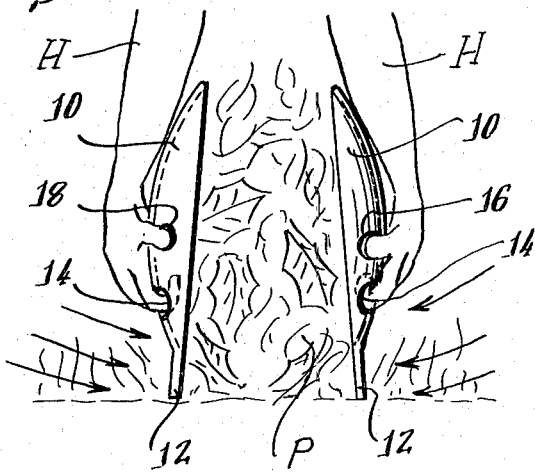
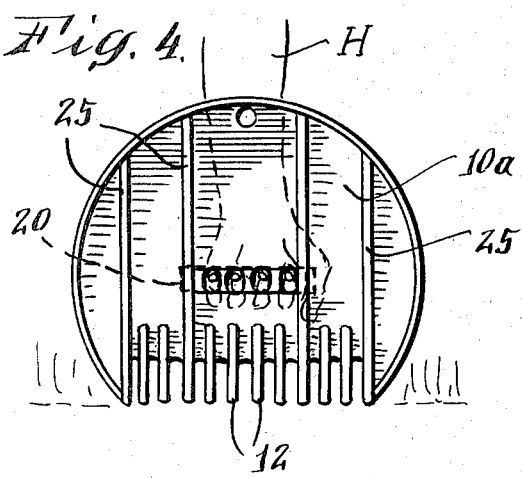
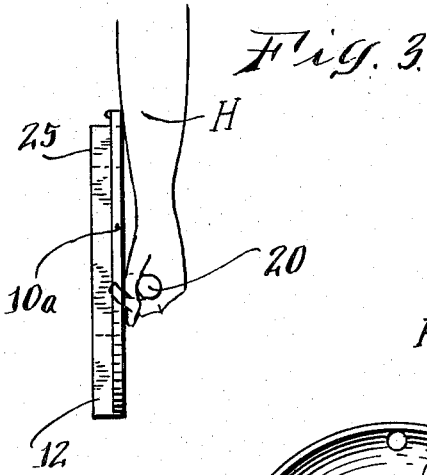
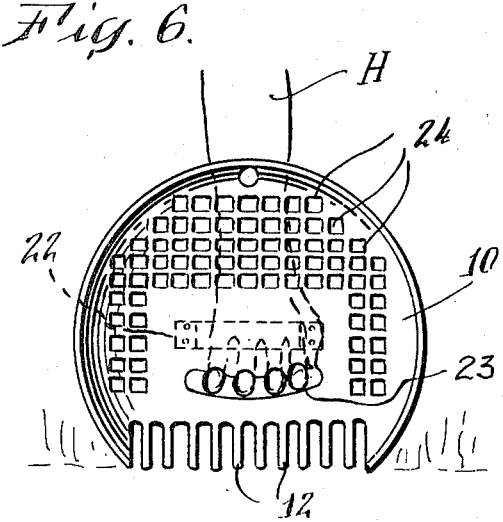
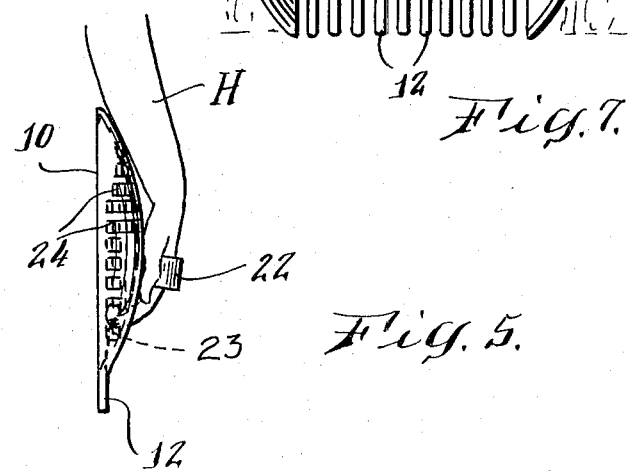

HAND SCOOP FOR GRASS AND LEAVES

Devices for gathering and lifting leaves, and other debris are known which take the form of arm scoops, and are difficult to use, as well as being cumbersome. The arm scoops are arm shovel arrangements which require the user to grasp the handle with the hands, and use the forearms and arm braces or bars for restricting movement of the forearms when picking up leaves, rubbish or other debris.

U.S. Pat. No. 2,546,113 to Spang shows a triangular scoop having arm braces, as well as a handle for manipulating each of the scoops. The arm brace is designed to press against the user's forearm just below the elbow. Moreover, the use of arm braces reduced the flexibility necessary for effective comfortable gathering of leaves and other debris. U.S. Pat. No. 3,809,421 issued May 7, 1974 is another example of a pivotable shovel or scoop designed to be operated by the user's hand and forearm. This patent also shows the use of an arm brace. Thus, the prior art constructions were directed to a rather complicated arm and forearm scoop with either a pair of arm scoops or a pivoting pair of semi-circular blades. Furthermore, the prior art leaf gathering structures used a wire frame with a solid bottom ground-engaging portion. This construction created a great deal of resistance as it was pushed along the ground, riding over much of the leaves and cut grass rather than combing the grass to clean the same, and to totally collect the leaves. Furthermore, the inherent resistance by the solid bottom frame causes fatigue to the user.

It is a feature of the present invention to provide a pair of grass and leaf pickup scoops which are light in weight, easy to handle, and are provided with a comb for raking leaves.

It is another feature of the present invention to provide a pair of balanced scoops for picking up a pile of leaf and grass clippings having openings in the scoop for finger or hand grips, and no restrictive places for the arms, so that the hands and arms are flexible, and can be maneuvered in a fashion whereby the scoops are in effect extensions of the arm.

It is another feature of the present invention to provide generally circular hand scoops having comb blades at the flat bottom edge, and to provide the scoops with handles thereon, which are either projections from the rear surface of each scoop, or openings therein to match the fingers and thumb of the user's hand.

Another feature of the present invention is to provide a swivel hand grip in order to change the angle of lift of the scoops to suit the individual facility in lifting and disposing of accumulated debris.

It is a further feature of the present invention to provide grass and leaf pickup scoops which are flat or concave in shape, and which may have small openings therein in order to reduce the overall weight.

Another feature of the present invention is to provide hand-operated scoops for leaves, grass and other debris, which can be easily manipulated to pick up piles of debris and deposit them in plastic bags, containers, wheelbarrows, or other means for transporting debris and rubbish to a dump site.

In order that the invention will be more clearly understood, it will now be disclosed in greater detail with reference to the accompanying drawings, in which:

FIG. 1 is a front elevation view of a hand scoop, for grass, leaves, and other debris constructed in accordance with the teachings of our invention.

FIG. 2 is a side elevation view of a pair of hand scoops of the type shown in FIG. 1 being used to pick up a pile of leaves, and other debris.

FIG. 3 is a side elevation view of a further embodiment of the present invention showing a scoop for leaves, and other debris, and having a fixed hand grip.

FIG. 4 is a front elevation view of the embodiment shown in FIG. 3.

FIG. 5 is another embodiment of the present invention showing a side elevation view of a scoop for picking up leaves and grass, and showing the hand grip having a finger nest or grip, and an elastic hand band circling the back of the user's hand.

FIG. 6 is a front elevation view of the embodiment shown in FIG. 5, and

FIG. 7 is a front elevation view showing a hand scoop for grass and leaves in which the hand grip is mounted for limited movement on the rear surface of said concave scoop in order to adjust the angle of lift of said scoop.

Referring to FIGS. 1 and 2 a concave scoop 10 is shown which is used in pairs, each of which are generally circular in configuration except for the bottom portion thereof which is provided with teeth 12 extending linearly. Furthermore, each of the scoops are provided with finger openings 14 centrally located in the scoop, together with a left thumb opening 16 and a right thumb opening 18 disposed laterally from the other of said finger openings. As seen in FIGS. 1 and 2, the user's hand H are placed adjacent to the exterior wall of the scoop with the fingers inserted in finger openings 14. With this positioning of the hands, the arms fall naturally around the upper portion of each scoop, thus permitting the user to gather a pile of leaves, cut grass or the like P, as shown in FIG. 2, by moving the scoops toward each other. In this manner the teeth 12 of the comb effectively rake the leaves and other debris into the pile P. Thus, the pile of debris is confined so that it can be easily picked up, and inserted into a bag, container or wheelbarrow for disposal. It should be evident that the present arrangement forms a pair of balanced scoops so that the hands, with their known dexterity, can maneuver leaves, and other debris into an accumulated pickup position.

FIGS. 3 and 4 show another embodiment of the present invention having a rib 25 reinforced flat hand scoop 10A and teeth 12 of a comb disposed at the bottom thereof, which is the same as that shown in FIGS. 1 and 2. However, the embodiment shown in FIGS. 3 and 4 further disclose a fixed hand grip 20 which extends outwardly from the back side of the scoop 10A.

FIGS. 5 and 6 show another embodiment of the present invention in which like numerals refer to similar elements of the invention. In addition, the hand H is supported by a flexible member shown as elastic hand band 22 that encircles the back of the hand H and is secured to the convex side of concave scoop 10. Located below the hand band is an opening 23 in the hand scoop forming a gripping surface for the user's fingers. Furthermore, in order to reduce the overall weight of the device, the hand scoop 10 is provided with a plurality of relatively small openings 24. This arrangement, although it reduces weight, does not permit leaves, grass or other debris to fall through the openings when the collected pile is lifted, since the openings 24 are so small that little or no collected debris pass therethrough.

FIG. 7 shows another embodiment of the present invention in which like reference numerals refer to like elements of the invention. A scoop 10 is provided with radial-disposed, curved slots 26 that are spaced from one another. A hand grip 28 is provided with projections 30 which are captured in slots 26, but movable therein to a limited degree depending upon the size of the slots. The construction of FIG. 7 permits the user to swivel the hand grip to a selected position, and thereby vary the angle of lift of the scoops for ease of use.

It should be apparent that the present invention provides a pair of hand scoops that are efficient for assembling and picking up leaves, grass and other debris, while effectively combing the grass to rake up leaves that ordinarily would not be gathered up by the hand scoops because they are in effect an extension of the hand, resulting in dexterous handling of debris, and greatly reducing the time and effort to accomplish this work. The devices may be fabricated in metal, wire mesh, plastic, fiberglass, or any other suitable material. In addition, the concave shape is effective for maximum pickup of leaves. Moreover, if desired, ribs or flanges (not shown) may be incorporated in each of the scoops to increase the rigidity of the structure, and to form gathering and holding compartments for leaves and other debris.

What is claimed is:

1. A hand scoop for gathering leaves or other debris and depositing into a receptacle comprising a scoop body having a depression for holding a large amount of leaves and debris and a generally curved periphery for said scoop body, means on said scoop body for the user's hand to grip and manually move said scoop, and a flat marginal edge at the bottom of said scoop body being provided with a plurality of spaced teeth for raking and assembling said leaves or other debris, and said curved periphery providing easy entry into said depositing receptacle.

2. A hand scoop as claimed in claim 1 wherein said gripping means on said scoop body are a plurality of thumb and finger openings.

3. A hand scoop as claimed in claim 1 wherein said scoop body is concave and is provided with gripping means in the form of a handle secured to the convex side of said scoop body.

4. A hand scoop as claimed in claim 1 wherein said gripping means is located generally centrally on said scoop body.

5. A hand scoop as claimed in claim 1 wherein said scoop body is provided with a plurality of openings in an area thereof remote from said spaced teeth for reducing the overall weight of said scoop while the central section of said scoop body remains unperforated.

6. A hand scoop as claimed in claim 1 and further provided with a pair of curved slots spaced from each other, and wherein said gripping means is a hand grip provided with projecting riding in said slots and captured therein whereby the position of said hand grip can be selectively changed within limited boundaries.

7. A pair of hand scoops for gathering leaves or other debris and operated by a user together and movable toward each other to form a pile of leaves or other debris comprising: each hand scoop having a scoop body provided with a depression thereon for holding a large amount of leaves and debris and a generally curved periphery for said scoop body, means on said scoop body for the user's hand to grip and manually move said scoops toward each other, each having a flat marginal edge at the bottom of the respective scoop body provided with a plurality of spaced teeth for raking and assembling said leaves or other debris into an accumulated pile, and the curved periphery of the scoop body adjacent to said flat marginal edge being shaped for easy entry into a depositing receptacle.

8. A pair of hand scoops as claimed in claim 7 wherein said depression is a concave configuration, and said hand gripping means for each scoop are finger openings located generally centrally in said scoop body.

9. A pair of hand scoops as claimed in claim 8 wherein said finger openings include apertures for both the right and left thumbs whereby each scoop can be used by either hand.

* * * * *